US006171569B1

(12) United States Patent
Brandt

(10) Patent No.: US 6,171,569 B1
(45) Date of Patent: Jan. 9, 2001

(54) METHOD OF ELIMINATING MALODORS FROM GASES

(75) Inventor: Daniel J. Brandt, Pottsdown, PA (US)

(73) Assignee: Occidental Chemical Corporation, Dallas, TX (US)

(*) Notice: Under 35 U.S.C. 154(b), the term of this patent shall be extended for 0 days.

(21) Appl. No.: 09/448,785

(22) Filed: Nov. 24, 1999

(51) Int. Cl.$^7$ .................................................. C08F 114/06
(52) U.S. Cl. .................. 423/245.2; 423/210; 526/344.1; 526/344.2; 95/237
(58) Field of Search .............................. 526/344.2, 344.1; 423/210, 245.2; 95/237

(56) References Cited

U.S. PATENT DOCUMENTS

| 1,716,028 | * | 2/1929 | Canon | 423/245.2 |
| 3,054,653 | * | 9/1962 | Barton | 423/245.2 |
| 3,864,485 | * | 2/1975 | Horsley | 423/210 |
| 4,186,259 | * | 1/1980 | Bush | 526/344.2 |

FOREIGN PATENT DOCUMENTS

| 986524 | * | 2/1965 | (GB) | 423/245.2 |
| 10140179 | | 5/1998 | (JP). | |

OTHER PUBLICATIONS

Abstract of article titled, "Degree of Fatty Acid Neutralization by Aqueous Sodium Hydrogen Carbonate Solutions" by A. N. Morgunov et al. in Maslo–Zhir. Prom–st. (10), 20–2 (1976).

* cited by examiner

*Primary Examiner*—Tom Dunn
(74) *Attorney, Agent, or Firm*—Richard D. Fuerle; Anne E. Brookes

(57) ABSTRACT

Disclosed is a method of eliminating the odor from a malodorous gas, where the odor is due to the presence of a $C_{10}$ to $C_{18}$ fatty acid in the gas. An aqueous solution containing at least a stoichiometric amount of a base that reacts with said $C_{10}$ to $C_{18}$ fatty acid to produce a salt is sprayed into the gas.

20 Claims, No Drawings

METHOD OF ELIMINATING MALODORS FROM GASES

BACKGROUND OF THE INVENTION

This invention relates to a method of eliminating foul-smelling odors from gases. In particular, it relates to eliminating the odor of fatty acids from air by spraying a solution of a base into the air.

In manufacturing poly(vinylchloride) (PVC) by an emulsion process, an emulsion of PVC particles in water is sprayed into warm air to evaporate the water and dry the resulting PVC particles. A fan forces huge volumes of this air through a drying system, which trap the PVC particles, and the air is then released into the atmosphere. This air can have an objectionable odor and its release generates complaints from people in the vicinity. Companies making PVC are being required to de-odorize this air. Deodorizers tested have not been found to be effective and scrubbers, though probably effective, cost many millions of dollars to install and operate.

SUMMARY OF THE INVENTION

I have discovered that the source of the objectionable odor in drying gases from certain PVC polymers is fatty acid. Fatty acid is formed from an ammonium fatty acid salt, which is used in the PVC polymerization process as a surfactant. Although the fatty acid is present in only ppm (parts per million, by weight) concentrations, it can be detected by a human being having a nose of average sensitivity, at ppb (parts per billion, by weight) concentrations. I have further found that spraying the drying gas with an aqueous solution of a base forms a salt, which significantly reduces or eliminates the odor because these salts have little or no odor. Spraying with a basic solution costs very little to implement and operate, is safe to handle, and does not add harmful chemicals to the environment.

DESCRIPTION OF THE PREFERRED EMBODIMENTS

This invention is applicable to gases containing $C_{10}$ to $C_{18}$ fatty acids and it is particularly applicable to gases containing $C_{10}$ to $C_{14}$ saturated aliphatic fatty acids. Examples of such acids include lauric acid, palmitic acid, and stearic acid. The invention is most useful if the concentration of the fatty acid in the gas is less than about 100 ppm as other methods may not be suitable at those low concentrations. The invention is also most useful for treating very large volumes of gas, such as more than 10,000 SCFM (standard ft$^3$/min, 283 m$^3$/min) as other methods are too expensive to handle so much gas.

Into the gas to be deodorized is sprayed an aqueous solution of a base that will react with the fatty acid to form a salt. Examples of bases that can be used include sodium carbonate, sodium bicarbonate, potassium carbonate, potassium bicarbonate, sodium hydroxide, potassium hydroxide, calcium hydroxide, and mixtures thereof. The preferred base is sodium carbonate because it has been found to be very effective and it is inexpensive and safe to use. The concentration of the solution should be about 0.05 wt % to saturation as lower concentrations may be less effective; preferably, the concentration is about 0.2 to about 1.0 wt %. At least a stoichiometric amount of base should be used, but more than about 7 times stoichiometric is usually unnecessary. To ensure that all or almost all of the fatty acid is reacted without using excess base, it is preferable to use about 2 to about 4 times the stoichiometric amount of base. The solution should be sprayed into the air to be treated in a finely-divided form, preferably atomized.

The following examples further illustrate this invention:

EXAMPLE 1

The stack gas emanating from a commercial PVC manufacturing plant in which an ammonium laurate surfactant was used in a vinyl chloride emulsion microsuspension polymerization process was found to contain 5.6 to 7.3 mg/m$^3$ of lauric acid, 0.6 to 2.3 mg/m$^3$ of cetyl alcohol, and 0.02 to 0.2 mg/m$^3$ of stearyl alcohol. By smelling pure lauric acid, the odor of the stack gas was determined to be primarily due to lauric acid.

EXAMPLE 2

A laboratory scale lauric acid emitting stack was constructed to test the effectiveness of various substances in eliminating the odor of lauric acid. The stack was placed in a closed laboratory room and aqueous solutions of various materials were sprayed into the exhaust gas from the stack. After 10 minutes, 5 members of a test panel entered the room to note any odors present. The substances tested and the results are as follows:

| Test | Substance Tested | Concentration | Lauric Acid Odor |
| --- | --- | --- | --- |
| 1 | No spray | | Strong |
| 2 | Water spray | " | Strong |
| 3 | "Nalco 1853 Fog"[1] | 200/1 | Less than Test 1 |
| 4 | " | 400/1 | Detectible |
| 5 | " | 800/1 | Detectible |
| 6 | " | 1600/1 | Detectible |
| 7 | " | 300/1 | Detectible |
| 8 | "ECS-2500"[2] | 100/1 | Less than Test 1 |
| 9 | "ECOSORB"[3] | 100/1 | Medium to strong |
| 10 | "Prosweet" OC2526"[4] | 100/1 | Masked by strong odor of "Prosweet" |
| 11 | "Prosweet" OC2529"[5] | 100/1 | Strong, and unpleasant odor of "Prosweet" |
| 12 | $Na_2CO_3$ | 0.2%, pH 10.9 | None |
| 13 | " | 0.1%, pH 10.5 | Very slight |
| 14 | " | 0.05%, pH 9.8 | Slight |
| 15 | $NaHCO_3$ | 0.2% | Detectible |
| 16 | " | 0.4% | Less than Test 14 |

[1]Proprietary blend of essential (natural) oils, sold by Odor Control Technology
[2]Proprietary blend of essential (natural) oils, sold by Environmental Control
[3]Proprietary material sold by Odor Management, Inc.
[4]Proprietary material sold by Betz Dearborn
[5]Proprietary material sold by Betz Dearborn

EXAMPLE 3

At a large PVC manufacturing plant where ammonium laurate was used as a surfactant, the stack air flow was about 60,000 SCFM (standard cubic feet per minute, 1700 m$^3$/min) and the lauric acid in the stack emissions ranged from 1.26 to 1.64 lb/hr. (0.57 to 0.74 kg/hr). A nozzle was inserted into the exhaust stack before the fan and 0.15 lb/min (0.068 kg/min) of a 5 wt % aqueous solution of sodium carbonate was sprayed in atomized form into the stack gas through the nozzles. Over a three month period, complaints about odors from persons in the vicinity declined by 75%, compared to the same period the previous year.

I claim:

1. In a method of making poly(vinylchloride) using a $C_{10}$ to $C_{18}$ fatty acid salt, where said poly(vinylchloride) is dried in air, said air is released to the atmosphere, and said air is malodorous, a method of reducing the malodorousness of said air, where said malodor is due to the presence of a $C_{10}$ to $C_{18}$ fatty acid in said air, comprising spraying into said air an aqueous solution containing at least a stoichiometric amount of a base that reacts with said $C_{10}$ to $C_{18}$ fatty acid to produce a salt.

2. A method according to claim 1 wherein said odor is due to the presence of a $C_{10}$ to $C_{14}$ saturated aliphatic fatty acid in said gas.

3. A method according to claim 2 wherein said odor is due to the presence of lauric acid in said gas.

4. A method according to claim 1 wherein said base is selected from the group consisting of sodium carbonate, sodium bicarbonate, potassium carbonate, potassium bicarbonate, sodium hydroxide, potassium hydroxide, and mixtures thereof.

5. A method according to claim 4 wherein said base is sodium carbonate.

6. A method according to claim 1 wherein the concentration of said base in said aqueous solution is about 0.05 wt % to about saturation.

7. A method according to claim 6 wherein the concentration of said base in said aqueous solution is about 0.2 to about 1.0 wt %.

8. A method according to claim 1 wherein the amount of said base is about 2 to about 4 times stoichiometric.

9. A method according to claim 1 wherein said aqueous solution is atomized.

10. A method according to claim 1 wherein the concentration of said fatty acid in said air is less than 100 ppm.

11. A method according to claim 1 wherein the volume of said air is at least 10,000 SCFM.

12. In a process for making poly(vinylchloride) wherein an ammonium salt of lauric acid, palmitic acid, or stearic acid is used as a surfactant in manufacturing a poly (vinylchloride) aqueous emulsion and said aqueous emulsion is sprayed into warm air to dry said polyvinyl(chloride), a method of rendering said air less malodorous comprising spraying into said air an aqueous solution containing about 2 to about 4 times the amount of a base that is needed to react with any lauric acid, palmitic acid, or stearic acid in said air.

13. A method according to claim 12 wherein said ammonium salt is ammonium laurate.

14. A method according to claim 12 wherein said base is sodium carbonate.

15. A method according to claim 12 wherein the concentration of said base in said aqueous solution is about 0.2 to about 1.0 wt %.

16. A method according to claim 12 wherein said aqueous solution is atomized.

17. A method of making poly(vinylchloride) comprising (A) polymerizing vinyl chloride monomer in an emulsion microsuspension polymerization process to produce an emulsion containing particles of poly(vinylchloride);

(B) adding ammonium laurate to said emulsion;

(C) spraying said emulsion into warm air, whereby lauric acid is formed;

(D) passing said warm air through a poly(vinyl chloride) drying system; and (E) spraying into said warm air from said drying system an aqueous solution of about 0.05 to about 1.0 wt % sodium carbonate containing about 2 to about 4 times the amount of sodium carbonate needed to stoichiometrically react with said lauric acid.

18. A method according to claim 12 wherein said base is selected from the group consisting of sodium carbonate, sodium bicarbonate, potassium carbonate, potassium bicarbonate, sodium hydroxide, potassium hydroxide, and mixtures thereof.

19. A method according to claim 12 wherein the concentration of said lauric acid, palmitic acid, or stearic acid in said air is less than 100 ppm.

20. A method according to claim 12 wherein the volume of said warm air is at least 10,000 SCFM.

* * * * *